US007895821B2

(12) United States Patent
Annigeri et al.

(10) Patent No.: US 7,895,821 B2
(45) Date of Patent: Mar. 1, 2011

(54) SYSTEM AND METHOD FOR AUTOMATIC FUEL BLENDING AND CONTROL FOR COMBUSTION GAS TURBINE

(75) Inventors: Ravindra Annigeri, Roswell, GA (US); Jeffrey S. Goldmeer, Latham, NY (US); Anthony B. Campbell, Simpsonville, SC (US); Joshua S. Sater, Greenville, SC (US)

(73) Assignee: General Electric Company, Schenectady, NY (US)

(*) Notice: Subject to any disclaimer, the term of this patent is extended or adjusted under 35 U.S.C. 154(b) by 320 days.

(21) Appl. No.: 12/347,376

(22) Filed: Dec. 31, 2008

(65) Prior Publication Data

US 2010/0162678 A1 Jul. 1, 2010

(51) Int. Cl.
*F02C 3/20* (2006.01)
(52) U.S. Cl. .................................. 60/39.463; 60/39.281
(58) Field of Classification Search ............... 60/39.281, 60/39.463, 734, 772
See application file for complete search history.

(56) References Cited

U.S. PATENT DOCUMENTS

| 4,833,878 | A | * | 5/1989 | Sood et al. ........................ 60/778 |
| 5,293,857 | A | | 3/1994 | Meyer |
| 6,082,092 | A | | 7/2000 | Vandervort |
| 6,282,883 | B1 | | 9/2001 | Uematsu et al. |
| 6,874,323 | B2 | | 4/2005 | Stuttaford |
| 6,890,671 | B2 | | 5/2005 | Roche et al. |
| 2003/0217555 | A1 | * | 11/2003 | Gerhold ........................ 60/776 |
| 2007/0089426 | A1 | | 4/2007 | Vandale et al. |
| 2008/0155987 | A1 | | 7/2008 | Amond et al. |
| 2008/0267783 | A1 | | 10/2008 | Kraemer et al. |
| 2009/0107105 | A1 | * | 4/2009 | Ziminsky et al. .......... 60/39.463 |

* cited by examiner

*Primary Examiner* — Michael Cuff
*Assistant Examiner* — Phutthiwat Wongwian
(74) *Attorney, Agent, or Firm* — Edward J. Smith; Ernest G. Cusick; Frank A. Landgraff

(57) ABSTRACT

A flexible and automatic system and method for blending an inexpensive secondary gas with a primary gas fuel for operation of a Dry Low NOx gas turbine. The secondary gas may be a gas fuel such as hydrogen, ethane, butane, propane and liquefied natural gas or an inert gas. Combustion dynamics are avoided by controlling the blended fuel within a permissible range for a Modified Wobbe Index. Combustion dynamics and gas turbine exhaust emissions may also be monitored to maintain safe combustion with the blended fuel. A gas turbine control system may adjust the blend and temperature of the primary gas fuel and the secondary gas to promote desired combustion.

32 Claims, 4 Drawing Sheets

SYSTEM AND METHOD FOR AUTOMATIC FUEL BLENDING AND CONTROL FOR COMBUSTION GAS TURBINE

BACKGROUND OF THE INVENTION

The invention relates generally to combustion gas turbines and more specifically to system control for blending secondary gases with a primary gas fuel and operating the gas turbine with the blended fuel mixture.

Heavy-duty gas turbines equipped with Dry Low NOx (DLN) combustion system have typically operated on 100% pipeline natural gas fuel. In recent years, natural gas fuel prices have continued to increase dramatically, forcing combustion turbine power plants to explore alternates to natural gas fuels. Many power plants are evaluating use of alternate fuels such as imported liquefied natural gas (LNG) as several terminals are being permitted in the US and other parts of the world for LNG introduction. Certain industrial and petrochemical businesses that employ combustion gas turbines also produce hydrogen-containing process gases (also known as off-gas) during chemical processes as a by-product. These process gases often times possess substantial heating value. Process gases contain hydrogen, as well as hydrocarbon species such as methane, ethane, etc. Such businesses desire to reduce natural gas fuel consumption for their combustion gas turbines by blending some percentage of process off-gases with their main natural gas fuel supply. In other instances, non-fuel gases may be added to the fuel-air mixtures to enhance power output from the gas turbine.

Gas turbines equipped with low Nitrous xide (NOx) emission combustion systems typically employ a process known as lean, pre-mixed combustion where fuel and combustion air are mixed upstream of the combustion zone to control and limit thermal NOx production. Such combustion systems often function well over a relatively narrow range of fuel injector pressure ratios and fuel compositions. If gas turbine combustion systems are operated outside of that range, combustion dynamics levels (noise pressure waves due to oscillatory combustion process) can get large enough to cause significant distress to combustion parts, thereby shortening the maintenance intervals or even cause irreparable hardware damage and forced outages. Historically, pipeline natural gas composition in general and specifically it's Wobbe Index (WI) and Modified Wobbe Index (MWI) have varied very slightly. MWI is calculated using an equation MWI=[LHV/sqrt(SG*T)], where LHV represents fuel Lower Heating Value (BTU/SCFT), SG represents specific gravity of fuel gas relative to air and T represents gas fuel temperature in degrees Rankine (also known as degrees absolute). Combustion turbine fuel nozzles are sized for a limited range of natural gas fuel MWI variations and a permissible variation in MWI of ±5% is generally accepted in gas turbine industry.

For many low NOx combustion systems, often times periodic adjustments to fuel schedules are required for maintaining acceptable levels of dynamics when the MWI of incoming gas fuel varies either due to changes in fuel temperatures or fuel compositional changes which impacts Lower Heating Value (LHV). Such fuel schedule adjustments (also referred to as "re-tuning") are expensive requiring trained specialists from original equipment manufacturer (OEM) and instrumentation.

Consequently, turbine equipment suppliers typically tightly control the content of fuels for their DLN (Dry Low NOx) gas turbines. As a result, fuel specifications do not typically allow any amount of hydrogen to be present in the fuel gas of lean pre-mixed combustion systems due to the increased risk introduced by the hydrogen.

U.S. Pat. No. 6,082,092 by Vandervort teaches that by monitoring of gas Modified Wobbe Index (MWI), the pre-heat temperature of the fuel can be adjusted up or down to maintain the gas fuel MWI within the relatively narrow range required for the combustion system.

Attempts have also been made in various disparate applications to utilize mixture of natural gas fuel with other gas fuels as a blended fuel. U.S. Pat. No. 6,874,323 invented by Stuttaford describes a method of operating a gas turbine with a specific combustor structure to achieve overall lower emissions of nitrous oxides by supplying a mixture of natural gas and hydrogen gas to the combustion chamber of the gas turbine in a manner that the localized concentration of hydrogen gas is greater than 0.1% by mass of the mass of the mixture, and less than 20% by mass of the mixture prior to the combusting the mixture in the combustion chamber. U.S. Pat. No. 6,282,883 invented by Uematsu et. al. illustrates an easy plant starting provided in a hydrogen burning turbine plant for burning hydrogen and oxygen to generate high temperature steam for driving a turbine. U.S. Pat. No. 6,890,671 invented by Roche et. al. relates to fuel cell power plants, and more particularly operation of fuel cell power plants from multiple fuel sources. Fuel mixing control arrangements are provided for a fuel cell power plant operating on multiple fuels.

However, none of the above-described prior art provides a system for blending secondary gases or gas fuels with a primary gas fuel in a DLN gas turbine combustor premixing the fuel blend in all combustor nozzles and combusting within a single downstream combustion zone. Also the prior art does not control the fuel blend to avoid combustion dynamics and maintain low turbine exhaust emissions. Further with respect to blending of fuels, the addition of non-fuel, alternate gases such as nitrogen and carbon dioxide to a primary gas fuel has not been described in such applications.

Accordingly, there is a need to provide a system allowing combustion turbine power plant owners to simultaneously reduce natural gas fuel consumption, reduce green house gas emissions, reduce operating costs and increase fuel flexibility. The system must control and modulate amount of alternate gas or alternate fuel (such as hydrogen, propane, butane, LNG etc.) injected into the primary gas fuel system of a combustion turbine equipped with low NOx emission combustion controls such that blended fuel gas properties are within acceptable range for combustion fuel nozzle designs.

BRIEF DESCRIPTION OF THE INVENTION

The present invention relates to a flexible and automatic system and method for blending an inexpensive secondary gas with a primary gas fuel for operation of a Dry Low NOx (DLN) gas turbine. According to a first aspect, a DLN combustion gas turbine is provided, which allows operation with a fuel blend of a primary gas fuel and a secondary gas. The combustion gas turbine includes a primary gas fuel supply system and a secondary gas supply system. A plurality of combustors each includes a single downstream combustion zone supplied by a center fuel nozzle centered on an axis of the combustor and a plurality of primary nozzles concentrically arranged around the center nozzle. The primary nozzles and the center fuel nozzle premix a fuel blend with air for the combustor. The fuel blend includes a primary gas fuel from the primary gas fuel supply system and an secondary gas from the secondary gas supply system;

The DLN gas turbine also provides a gas turbine control system, an emission control monitoring system; and a blended fuel control function. The blended fuel control function includes a fuel quality monitoring system and a combustion dynamics monitoring system adapted for controlling a fuel blend of a primary gas fuel from the primary gas fuel supply and an secondary gas from the secondary gas supply system according to a predetermined range in a quality of the fuel blend and an avoidance of combustion dynamics.

According to a second aspect of the present invention, a method for operating a DLN combustion gas turbine with a fuel blend of a primary gas fuel and a secondary gas is provided for combustors with a single downstream combustion zone supplied by a center fuel nozzle centered on an axis of the combustor and a plurality of primary nozzles concentrically arranged around the center nozzle. The primary nozzles and the center fuel nozzle premix a fuel blend with air for a combustor.

The method includes supplying a primary gas fuel from a primary gas fuel supply and supplying a secondary gas from a secondary gas supply and operating at least one combustor for a combustion gas turbine with a fuel blend within a predetermined range of the primary gas fuel and the secondary gas. The method also includes monitoring a quality of the fuel blend and monitoring combustion noise during operation with the fuel blend. The method controls a fuel blend of a primary gas fuel from the primary gas fuel supply and an secondary gas from the secondary gas supply system according to a permissible range in a quality of the fuel blend and an avoidance of combustion dynamics.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing a method and system for blending a desired amount of alternate gas into a primary natural gas fuel for a DLN combustion gas turbine. The alternate gas may be an alternate gas fuel (such as hydrogen, ethane, butane, propane, LNG etc.) or an inert gas, such as nitrogen and carbon dioxide. The embodiments provide a flexible and automatic control methodology, whereby relatively inexpensive alternate gas can be supplemented as part of combustion turbine's natural gas consumption. Key elements of this invention consist of integrating an existing combustion gas turbine controller with an alternate gas injection module, which is used for introducing desired quantity of alternate gas, a fuel quality sensor (such as gas chromatograph systems) for measuring properties of blended fuel mixture and a sensor for monitoring a combustion process. Depending on site configuration and existing fuel delivery system hardware, the alternate fuel injection module can be integrated with gas fuel heater, fuel line (piping) or as a separate/stand-alone skid for modulating blended fuel gas properties. Consumption of alternate gas fuels in combustion turbines can result in substantial natural gas fuel savings, reduction in green house gas emissions and operational cost savings for power plant owners. Furthermore, additional costs associated with disposition of process gases (such as storage, cleaning, flaring etc.) can be eliminated.

The system increases fuel flexibility of a gas turbine fitted with Dry Low NOx emission combustion system by enabling power plants to blend some amount of alternate gases. Such fuel flexibility could result in a considerable natural gas fuel savings and decreases gas turbine operating costs to power plant owners. A solution allowing 5% hydrogen blending could result in fuel savings estimated at several million dollars per turbine per year. Customer fuel savings could increase as natural gas prices increase or if the amount of hydrogen blending is increased.

The methodology presented below will control ratio of the primary gas fuel and the secondary gas such that variations in fuel properties (such as MWI, temperature, pressure) of the blended fuel are within the acceptable ranges for a typical low NOx emission combustion system. Fuel flexibility of gas turbines is enhanced and consumption of alternate fuel is permitted without need for expensive hardware modification to combustion systems. In addition, automated and flexible control methodology disclosed here can be used for blending several secondary gas fuels such as hydrogen, ethane, butane, propane, LNG etc. as well as other diluent gases.

Figure 1:
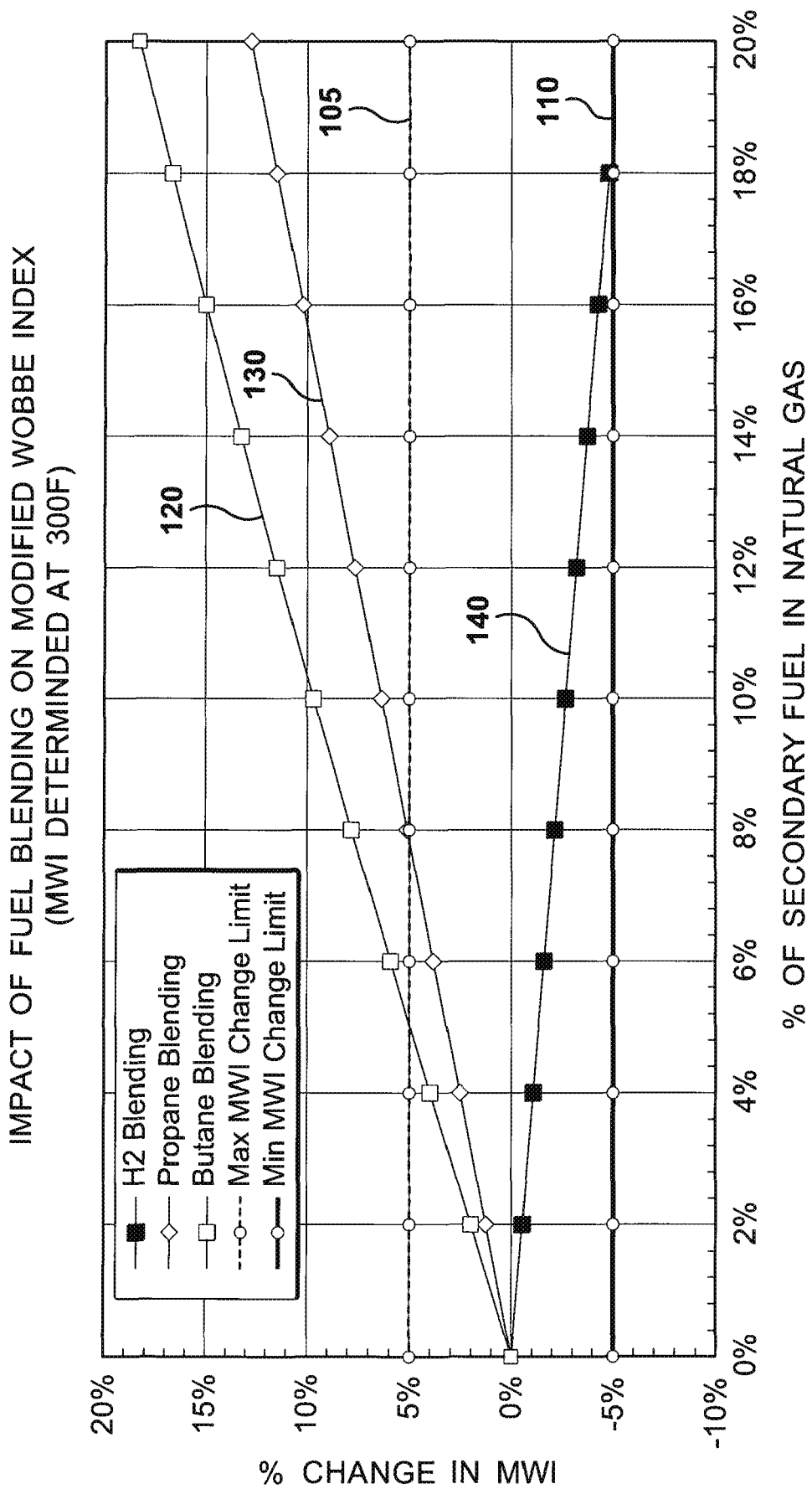
FIG. 1 provides a graph illustrating an impact of injection of alternate fuels (such as hydrogen, propane, butane, etc.) on the MWI of natural gas fuel.

FIG. 1 illustrates an impact of injection of secondary gas fuels (such as hydrogen, propane, butane, etc.) on MWI of a fuel blend with a primary natural gas fuel. The natural gas composition corresponds to a typical pipeline quality natural gas fuel that power plants in some parts of the North America consume on regular basis. A permissible variation in MWI of ±5% is generally accepted in gas turbine industry for combustion fuel nozzles. FIG. 1 shows the percent change in MWI of the fuel blend (with the gases at 300 degrees F.) versus the percent of specific secondary gas fuels in the fuel blend with natural gas. The +5% Wobbe 105 boundary is crossed for a butane gas fuel blend 120 at about 5% butane gas. The +5% Wobbe 105 boundary is crossed for a propane gas fuel blend 130 at about 8% propane gas fuel blend. The −5% Wobbe 110 boundary is crossed for a hydrogen gas fuel blend 140 at about 18% hydrogen gas. Although the figure shows that blending of relatively large percentages of some secondary fuels will change the MWI by less than 5%, there are other practical operating constraints that will prevent large quantities of secondary fuels from being mixed.

The inventive fuel supply system will include fuel quality monitoring sensors (such as gas chromatograph systems or other device for measuring gas species concentration so as to determine fuel gas composition, thereby allowing calculation of the LHV of the incoming gas fuel. The determined LHV of in-coming gas fuel can in-turn be used to determine instantaneous MWI and automatically modulate primary gas fuel and secondary gas fuel mixture ratio. By also feeding back to the fuel heater control system a demand to increase or decrease the gas pre-heat temperature, a much wider range of fuel composition and resulting MWI level can be employed without significant changes in combustion dynamics levels and minimal changes in NOx emissions.

A secondary gas supply system is used to blend a controlled amount of secondary gas into the primary gas fuel supply system. The secondary gas supply system may include gas control valves, stop valves, interconnecting piping, pressure gages, mass flow instruments, temperature gages etc., and may be similar to existing arrangements for the primary natural gas fuel supply system. The secondary gas supply system may be in modular form.

Figure 2:
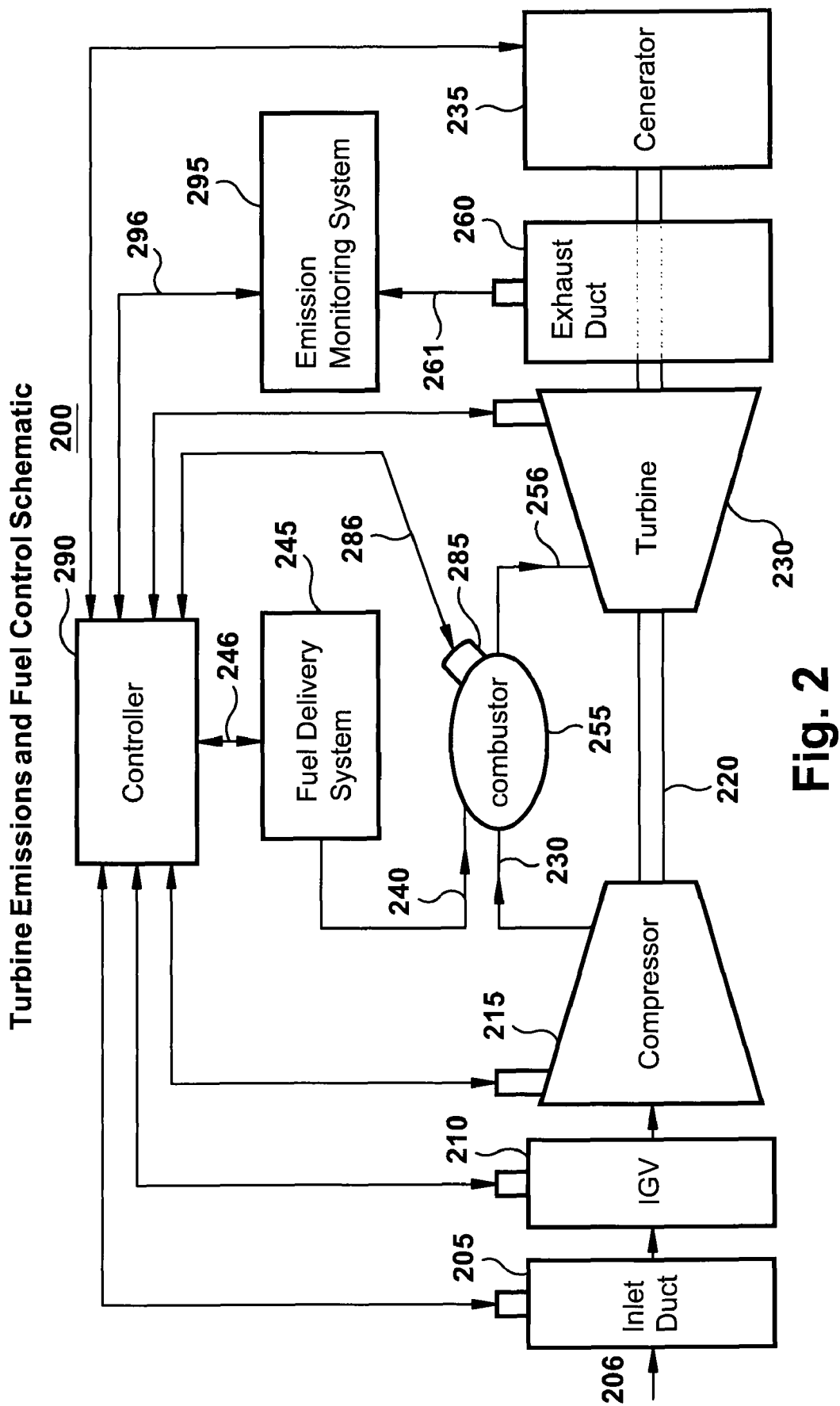
FIG. 2 illustrates a turbine emissions and fuel control schematic.

Gas turbine controller software may be modified such that the secondary gas supply can inject desired amount secondary gas according to a demand signal that may be established in the controller or which may be operator settable FIG. 2 illustrates a basic schematic for a DLN gas turbine emissions and fuel control system schematic 200 according to an embodiment of the present invention. An inlet duct 205 receives external air 206 and supplies the air to an inlet guide vane 210. The inlet guide vane 210 controls the flow of air to a compressor 215. The compressor 215 may be driven off a drive shaft 220 of the gas turbine 230. The drive shaft 220 of the operating turbine 230 drives the generator 235 for electric power production. Fuel 240 from a fuel delivery system 245 and compressed air 250 from the compressor 215 is supplied to a plurality of combustors 255, where the fuel and air is mixed and burned, generating hot gases. The hot gases 256 are delivered to drive the turbine 230 and are exhausted through an exhaust duct 260. A gas turbine controller 290 (such as a Speedtronic™ Mark Controller by General Electric Co.) provides overall control for the combustion gas turbine.

The controller 290 may receive measured and computed values for the blended fuel from the fuel delivery system 245. Such computed values may include a MWI for the fuel blend. The controller 290 may require that various computed values for the fuel blend be maintained within allowable limits and specifically that the MWI for the blended fuel remain within allowable limits. In the event that measured or computed MWI value for the blended fuel falls outside allowable range, the controller 290 may respond by using link 246 with the fuel delivery system 245 to adjust the temperature and blend of the fuel 240.

An emissions monitoring system 295 samples the exhaust gas 261 from the exhaust duct 260 and provides indication and control signals 296 to the controller 290. In the event that emissions are not being maintained within specification under operation with a blended fuel mixture, the controller 290 may respond by signaling 246 an adjustment to the temperature and blend of the fuel 240 of the fuel delivery system 245. The control system may further include combustion acoustic monitors 285 on the combustors 255, providing indication and control signals 286 to the controller 290, which may interpret the whether the combustors 255 are safely operating. In the event that the combustors 255 are not operating safely under a blended fuel mixture, the controller 290 may respond by adjusting 246 the temperature and blend of fuel 240 of the fuel delivery system 245.

Figure 3:
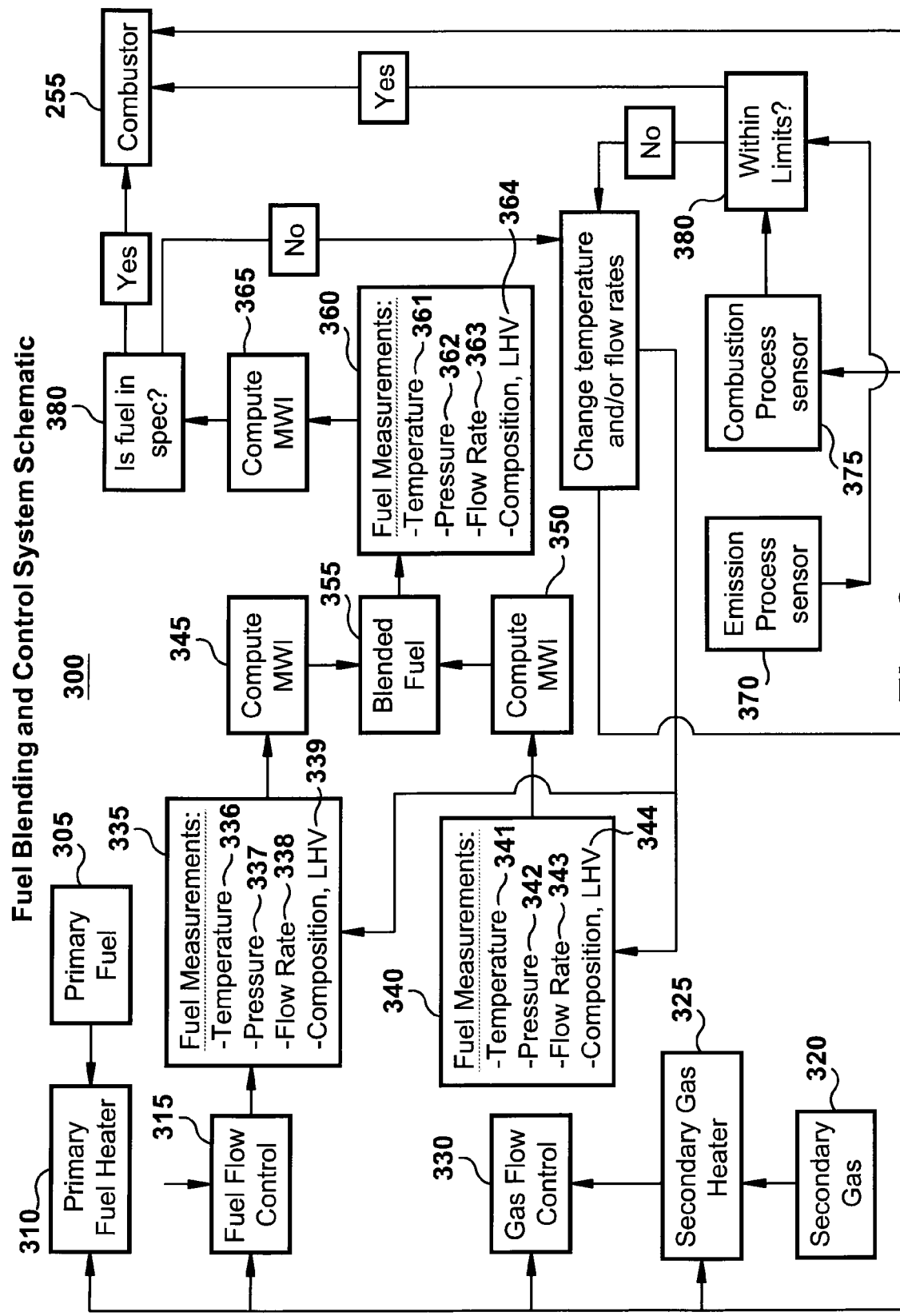
FIG. 3 illustrates an embodiment for an inventive fuel blending and control system schematic.

FIG. 3 illustrates an embodiment for an inventive fuel blending and control system schematic. A primary gas fuel supply 305 is provided through a primary fuel heater 310 and a primary fuel flow control 315. A secondary gas supply 320 is provided through a secondary gas heater 325 and a secondary gas flow control 330.

The gas supply hardware for both the primary gas fuel and the secondary gas may include stop valves, control valves, limit switches, pressure and temperature gages, flange connections, piping connections etc. The valves can be activated either electrically or pneumatically via combustion turbine controller.

Primary gas fuel sensors 335 are provided for measurement of primary fuel parameters and secondary gas sensors are provided for measurement of secondary gas parameters. Measured parameters for primary gas fuel and for secondary gas may include temperature 336, 341, pressure 337, 342, flow rate 338, 343 and gas composition 339, 344.

Fuel quality monitoring may require providing gas chromatographs or other like instruments for measurement of gas composition. Alternatively, power plants with existing gas chromatographs can integrate these instruments into embodiments of the system. The fuel quality monitoring sensors may be installed, either in the individual flow path for both the primary gas fuel and the secondary gas or in the flow path for the blended fuel. The gas chromatographs provides relative concentration of individual gas components, (e.g. methane, ethane, butane, propane, hydrogen) such that a weighted calculation can be performed within the system to determine the LHV and the MWI for the measured gas flow.

The sensors provided for the primary fuel flow and the secondary gas flow to yield measurements for the two flows individually, which may then be used to calculate the MWI for the blended flow 355. Alternatively, sensors 360 may measure directly monitor the blended fuel for a determination of the MWI 365 for the blended fuel.

Components can be either fully enclosed in a compact skid or can be installed as individual pieces depending on available space in a typical power plant. Depending on the configuration a typically power plant, other required hardware such as fuel heaters, filters, gas compressors etc. can be added for secondary gas supply line.

The existing combustion turbine controller software may be modified to allow secondary gas injection and allow blended fuel operation. An operator interface module may be added to the control software, to provide capability for the turbine operator to communicate a desired fuel mix demand signal. Alternatively, an operator interface may be integrated with power plant controller so that an automatic secondary gas mix demand signal can be sent to gas turbine controller.

Combustion dynamics monitoring instrumentation 375 are provided to sense performance within the plurality of combustors 255 for the gas turbine. The combustion dynamics monitoring instrumentation will provide combustion noise input to the controller 380, which will be used for assessing acceptable dynamics level in the low NOx combustion system for a given blended fuel mixture. If the operation with a blended fuel produces an unacceptable level of combustion dynamics, then the controller may modify the fuel blend or temperature for the primary gas fuel and/or the secondary gas.

A fuel mixture demand signal will allow the secondary gas fuel supply to inject desired amount of secondary fuels at a predetermined ramp rate such that MWI stays with in the prescribed limits of the combustion fuel nozzles.

An operator notification alarm will also alert the control room operator the amount of secondary fuel being introduced in to the combustion gas turbine. The controller software will initiate gas turbine run back to 100% primary gas fuel if the blended fuel goes outside the permissible ranges.

The control system 380 may also be integrated with emission monitoring system 370 to adjust the fuel blend and temperature such that impact on emissions could be minimized.

Figure 4:
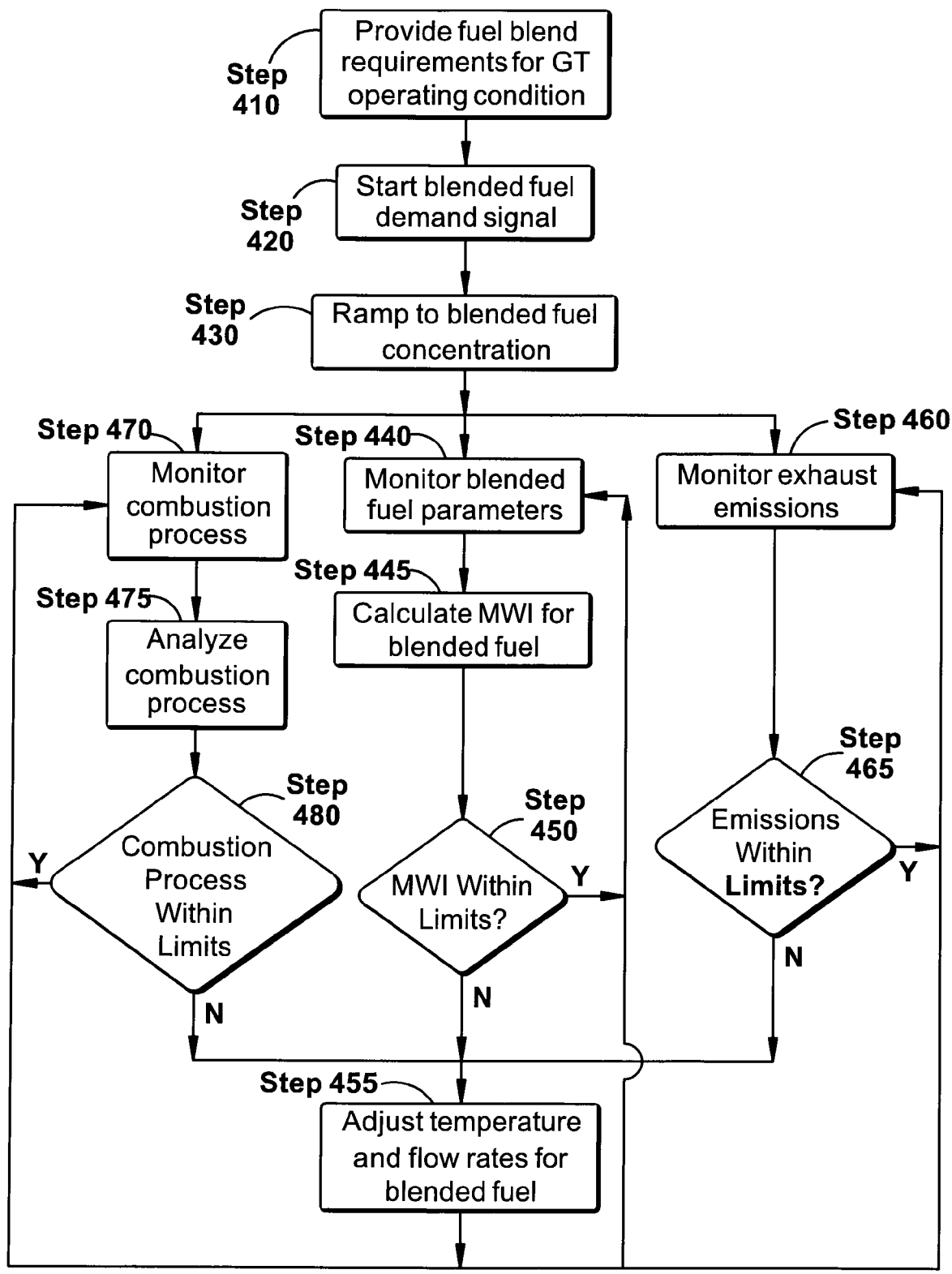
FIG. 4 illustrates a flow chart for a method of blending a secondary gas with a primary gas fuel.

FIG. 4 illustrates a flow chart for a method of blending a secondary gas with a primary gas fuel. In a first step 410 a percent blend is specified for the secondary gas to be blended with the primary gas fuel. In step 420 the secondary gas supply system is ordered by the system controller to supply a designated percent of the secondary gas at a specified temperature to supply a blended fuel consistent with fuel temperature required for the operating conditions of the gas turbine. The addition of the secondary gas as specified may be ramped to the desired blend in step 430. In step 440, instruments and a fuel quality sensor monitor the fuel blend. The fuel quality sensor may be a chromatograph or other instrument to determine the molecular composition of the fuel blend. In step 445, the MWI of the blended fuel may be calculated from the measured parameters. In step 450, the MWI of the blended fuel may be compared against a desired MWI provided by the system controller for the fuel. If the MWI for the blended fuel does not conform to the desired MWI for the fuel to within a predesignated tolerance, then the secondary gas temperature may be adjusted and the secondary gas flow may be reduced in step 455. If the MWI of the blended fuel is within the predesignated tolerance, then monitoring or the blended fuel continues in step 440.

Further, in step 460, the emission control sensors monitor gas turbine exhaust emissions while operating with a blend of primary gas fuel and a secondary gas. Emissions are compared against specified emission limits in step 465. If the emissions are within limits, then monitoring of emissions continues per step 460. If emissions fall outside specified emission limits in step 465, then controller may adjust the primary gas fuel and secondary gas temperatures and the primary gas fuel flow and the secondary gas flow in step 455 to restore emissions to within band in step 465.

Further in step 470, the combustion acoustics sensors may monitor acoustic noise levels within the combustor and provide to the controller for analysis. In step 475, the controller analyses the combustion process and in step 480 determines whether the combustion process is operating safely with the blended fuel. If the combustion process is not within acceptable limits, then the temperature and flow rates for the primary gas fuel and the secondary gas may be adjusted in step 455 to restore satisfactory combustion dynamics. If combustion operation is satisfactory then combustion monitoring continues per step 470.

In any of the above responses to unsatisfactory MWI, combustion dynamics or emissions, the response may include a runback to operation with 100 percent primary gas fuel.

The blended fuel system and method will allow power plant customers to lower operating costs and better compete on daily bidding of the power sales to open grid system. Further, the blended fuel system and method is environmentally responsible. The blended fuel system may be retrofit on existing gas turbine systems or be applied in new offerings.

In one such embodiment of the present invention, hydrogen gas as a secondary gas fuel may be blended with a natural gas fuel. In such a mixture, a desirable blend of the natural gas fuel and the secondary hydrogen gas may include a preferred mixture of approximately 5% hydrogen. Another embodiment may include a combination of about 10% hydrogen gas as a secondary gas fuel with natural gas as a primary gas fuel.

Further, the blending system hardware and control methodology may be scaled to various gas turbine frame sizes.

While various embodiments are described herein, it will be appreciated from the specification that various combinations of elements, variations or improvements therein may be made, and are within the scope of the invention.

The invention claimed is:

1. A Dry Low NOx (DLN) combustion gas turbine comprising:
   a primary gas fuel supply system;
   a secondary gas supply system; a combustor, comprising a single downstream combustion zone supplied by a center fuel nozzle centered on an axis of the combustor and a plurality of primary nozzles concentrically arranged around the center nozzle, wherein the primary nozzles and the center fuel nozzle premix a fuel blend with air for the combustor, and further wherein the fuel blend includes a primary gas fuel from the primary gas fuel supply system and an secondary gas from the secondary gas supply system;
   a gas turbine control system;
   an emission control monitoring system; and
   a blended fuel control function, including a fuel quality monitoring system that monitored a fuel blend composition and a combustion dynamics monitoring system that monitored a combustion dynamic level, wherein the blended fuel control function controlling the fuel blend of the primary gas fuel from the primary gas fuel supply and the secondary gas from the secondary gas supply system according to a predetermined range of the fuel blend composition and the combustion dynamic level.

2. The DLN combustion gas turbine according to claim 1, wherein the blended fuel control function is further adapted for controlling the blending of the primary gas fuel from the primary gas fuel supply system and the secondary gas from the secondary gas supply system according to controlling emissions within predetermined limits.

3. The DLN combustion gas turbine according to claim 2, wherein the primary gas fuel comprises a natural gas.

4. The DLN combustion gas turbine according to claim 2, wherein the secondary gas comprises a diluent.

5. The DLN combustion gas turbine according to claim 2, wherein the secondary gas comprises a gas fuel.

6. The DLN combustion gas turbine according to claim 5, wherein the secondary gas fuel comprises hydrogen gas.

7. The DLN combustion gas turbine according to claim 6, wherein the secondary gas fuel comprises a mixture at least two of the following: diluent, hydrogen, hydrocarbons including methane and ethane.

8. The DLN combustion gas turbine according to claim 5, wherein the secondary gas comprises at least one of ethane, butane, propane and liquified natural gas.

9. The DLN combustion gas turbine according to claim 2, the fuel quality monitoring system comprising:
   a fuel quality monitoring sensor adapted for measuring gas species measurement concentration of the fuel blend;
   a temperature measurement for the fuel blend and
   a calculator for a modified wobbe index (MWI) of the fuel blend.

10. The DLN combustion gas turbine according to claim 6, wherein the blended fuel control function further comprises:
   a predetermined blend ratio for the fuel blend;
   a permissible range for a calculated modified wobbe index (MWI) for the fuel blend; and
   an adjustment of at least one of the blend ratio for the fuel blend and a temperature of the primary gas fuel and secondary gas adapted for maintaining the calculated MWI for the fuel blend within the permissible range.

11. The DLN combustion gas turbine according to claim 10, wherein the permissible range for a calculated MWI for the fuel blend includes a range of about +5 percent to −5 percent around a MWI value determined by the control system for gas turbine operating conditions.

12. The DLN combustion gas turbine according to claim 10, wherein the predetermined blend ratio is operator-settable.

13. The DLN combustion gas turbine according to claim 10, wherein the predetermined blend ratio is automatically set by the turbine control system.

14. The DLN combustion gas turbine according to claim 10, wherein the blended fuel control function further comprises:
   a combustion noise input from the combustion dynamics monitoring system to the control system;

an assessment of acceptability of the combustion dynamics for operation with the blended fuel based on the combustion noise input;
an adjustment of at least one of the fuel blend and a temperature of at least one of the primary gas fuel and the secondary gas to avoid unacceptable combustion dynamics.

15. The DLN combustion gas turbine according to claim 10, wherein the blended fuel control function further comprises:
a runback to operation on 100 percent primary gas fuel if the MWI for fuel blend exceeds the permissible range.

16. The DLN combustion gas turbine according to claim 10, wherein the blended fuel control function further comprises:
an adjustment of at least one of the fuel blend and at least one of a temperature of the primary gas fuel and the secondary gas to avoid emissions control outside allowable limits.

17. A method for operating a Dry Low NOx (DLN) combustion gas turbine with a fuel blend of a primary gas fuel and a secondary gas, in a single downstream combustion zone supplied by a center fuel nozzle centered on an axis of the combustor and a plurality of primary nozzles concentrically arranged around the center nozzle, wherein the primary nozzles and the center fuel nozzle premix the fuel blend with air for a combustor, the method comprising:
supplying the primary gas fuel from a primary gas fuel supply;
supplying the secondary gas from a secondary gas supply;
operating at least one combustor of the combustion gas turbine with the fuel blend within a predetermined range of a fuel blend composition;
monitoring the fuel blend composition;
monitoring combustion noise during operation with the fuel blend;
controlling the fuel blend of the primary gas fuel from the primary gas fuel supply and the secondary gas from the secondary gas supply system according to a permissible range in the fuel blend composition and the combustion noise.

18. The method for operating a DLN combustion gas turbine with a fuel blend of a primary gas fuel and a secondary gas according to claim 17, further comprising:
monitoring gas turbine exhaust emissions; and
controlling the fuel blend of the primary gas fuel from the primary gas fuel supply and the secondary gas from the secondary gas supply system according to controlling gas turbine exhaust emissions within predetermined limits.

19. The method for operating a DLN combustion gas turbine with a fuel blend of a primary gas fuel and a secondary gas according to claim 17, the step of monitoring fuel composition comprising:
monitoring fuel blend composition with at least one fuel composition monitoring sensor adapted for measuring gas species measurement concentration of the fuel blend;
measuring the temperature of the fuel blend and
calculating a modified wobbe index (MWI) for the fuel blend.

20. The method for operating a DLN combustion gas turbine with a fuel blend of a primary gas fuel and a secondary gas according to claim 19, the step of controlling a fuel blend of a primary gas fuel from the primary gas fuel supply and an secondary gas from the secondary gas supply system according to a predetermined range in the fuel blend composition comprising:
maintaining the calculated MWI for the fuel blend within a permisssible range.

21. The method for operating a DLN combustion gas turbine with a fuel blend of a primary gas fuel and a secondary gas according to claim 20, the step of maintaining the calculated MWI for the fuel blend within a permissible range comprising:
maintaining the calculated MWI for the fuel blend within a range of about +5 percent and −5 percent of the MWI value determined by the control system for gas turbine operating conditions.

22. The method for operating a DLN combustion gas turbine with a fuel blend of primary gas fuel and a secondary gas according to claim 20, the step of maintaining the MWI for the fuel blend within a predetermined range comprising:
at least one of controlling fuel heating to adjust the temperature of the fuel blend to control the MWI within the predetermined limit; and adjusting a proportion of the primary gas fuel and the secondary gas in the fuel blend.

23. The method for operating a DLN combustion gas turbine with a fuel blend of primary gas fuel and a secondary gas according to claim 20, the step of maintaining the MWI for the fuel blend within a predetermined range further comprising:
initiating a gas turbine runback to 100 percent primary gas fuel if the MWI for the fuel blend cannot be maintained in the permissible range.

24. The method for operating a DLN combustion gas turbine with a blend of a primary gas fuel and a secondary gas according to claim 17, the step of controlling the fuel blend of the primary gas fuel from the primary gas fuel supply and the secondary gas from the secondary gas supply system according to a predetermined range of the fuel blend composition and the combustion noise comprising:
controlling a fuel temperature for at least one of the primary gas fuel and the secondary gas; and
adjusting the proportion of the primary gas fuel and the secondary gas.

25. The method for operating a DLN combustion gas turbine with a fuel blend of a primary gas fuel and an secondary gas according to claim 17, the step of operating the combustor for the gas turbine with the fuel blend comprising:
at least one of establishing a desired fuel blend command from an operator interface and establishing an automatic fuel blend control from the turbine control system.

26. The method for operating a DLN combustion gas turbine with a fuel blend of primary gas fuel and a secondary gas according to claim 17; the step of operating the combustor for the gas turbine with the fuel blend comprising:
ramping introduction of the secondary gas at a predetermined ramp rate to maintain a MWI of the blended fuel within predetermined limits.

27. The method for operating a DLN combustion gas turbine with a fuel blend of a primary gas fuel and a secondary gas according to claim 17, further comprising:
monitoring emissions for the combustion gas turbine; and
adjusting at least one of the fuel blend and a temperature of at least one of the primary gas fuel and the secondary gas for the blended fuel according to an emission control system signal.

28. The method for operating a DLN combustion gas turbine with a fuel blend of a primary gas fuel and a secondary gas according to claim 17, wherein the primary fuel comprises: a natural gas.

29. The method for operating a DLN combustion gas turbine with a fuel blend of a primary gas fuel and a secondary gas according to claim 17, wherein the secondary gas comprises: at least one of a secondary gas fuel and a diluent.

30. The method for operating a DLN combustion gas turbine with a fuel blend of a primary gas fuel and a secondary gas according to claim 17, wherein the secondary gas fuel comprises: a hydrogen gas.

31. The method for operating a DLN combustion gas turbine with a fuel blend of a primary gas fuel and a secondary gas according to claim 30, wherein the hydrogen gas comprises a concentration of up to approximately 10 percent.

32. The method for operating a DLN combustion gas turbine with a fuel blend of a primary gas fuel and a secondary gas according to claim 17, wherein the secondary gas fuel comprises: at least one of ethane, butane, propane and liquid natural gas.

\* \* \* \* \*